United States Patent
Hwang et al.

(10) Patent No.: US 10,070,172 B2
(45) Date of Patent: Sep. 4, 2018

(54) METHOD AND APPARATUS FOR PROCESSING BROADCAST DATA BY USING EXTERNAL DEVICE

(71) Applicant: LG ELECTRONICS INC., Seoul (KR)

(72) Inventors: Soojin Hwang, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/317,714

(22) PCT Filed: Jun. 30, 2015

(86) PCT No.: PCT/KR2015/006711
§ 371 (c)(1),
(2) Date: Dec. 9, 2016

(87) PCT Pub. No.: WO2016/003165
PCT Pub. Date: Jan. 7, 2016

(65) Prior Publication Data
US 2017/0111678 A1    Apr. 20, 2017

Related U.S. Application Data

(60) Provisional application No. 62/019,861, filed on Jul. 1, 2014.

(51) Int. Cl.
*H04N 7/16* (2011.01)
*H04N 21/422* (2011.01)
(Continued)

(52) U.S. Cl.
CPC ......... *H04N 21/42222* (2013.01); *H04N 5/44* (2013.01); *H04N 5/4403* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 9,398,322 B2 * | 7/2016 | Hawkins | H04N 21/4307 |
| 2011/0304690 A1 * | 12/2011 | Kang | H04N 13/0011 |
| | | | 348/43 |
| 2014/0111699 A1 * | 4/2014 | Kim | H04N 5/4403 |
| | | | 348/734 |

FOREIGN PATENT DOCUMENTS

| KR | 10-2010-0107142 A | 10/2010 |
|---|---|---|
| KR | 10-2012-0122042 A | 11/2012 |

(Continued)

*Primary Examiner* — Mulugeta A Mengesha
(74) *Attorney, Agent, or Firm* — Birch, Stewart, Kolasch & Birch, LLP

(57) ABSTRACT

The present invention relates to the provision of a method and/or an apparatus for processing broadcast data by using an external device. The apparatus for processing the broadcast data according to one embodiment of the present invention comprises: a reception unit for receiving video data and audio data; a decoder for decoding the received video data and the received audio data; an interface unit for transmitting, to an external device, characteristics information of the video data and the audio data, and receiving, from the external device, control information for controlling the display of the decoded video data and the playback of the decoded audio data; a display unit for displaying the decoded video data on the basis of the received control information; and an audio playback unit for playing the decoded audio data on the basis of the received control information.

6 Claims, 14 Drawing Sheets

(51) Int. Cl.
    *H04N 13/161* (2018.01)
    *H04N 13/194* (2018.01)
    *H04N 13/30* (2018.01)
    *H04N 5/44* (2011.01)
    *H04N 13/04* (2006.01)
    *H04N 21/41* (2011.01)
    *H04N 21/431* (2011.01)
    *H04N 21/485* (2011.01)
    *H04N 21/81* (2011.01)
    *H04N 13/00* (2018.01)
    *H04N 5/60* (2006.01)

(52) U.S. Cl.
    CPC ........... *H04N 5/60* (2013.01); *H04N 13/0011* (2013.01); *H04N 13/0022* (2013.01); *H04N 13/0048* (2013.01); *H04N 13/0059* (2013.01); *H04N 13/04* (2013.01); *H04N 13/161* (2018.05); *H04N 13/194* (2018.05); *H04N 13/30* (2018.05); *H04N 21/4126* (2013.01); *H04N 21/42207* (2013.01); *H04N 21/42209* (2013.01); *H04N 21/42224* (2013.01); *H04N 21/431* (2013.01); *H04N 21/4852* (2013.01); *H04N 21/4854* (2013.01); *H04N 21/8106* (2013.01); *H04N 21/816* (2013.01); *H04N 2005/441* (2013.01); *H04N 2005/4407* (2013.01); *H04N 2005/4425* (2013.01); *H04N 2005/4428* (2013.01)

(56) References Cited

FOREIGN PATENT DOCUMENTS

| | | |
|---|---|---|
| KR | 10-2013-0119233 A | 10/2013 |
| KR | 10-2013-0127344 A | 11/2013 |
| KR | 10-2014-0001726 A | 1/2014 |
| WO | WO 2014/003378 A1 | 1/2014 |

\* cited by examiner

FIG. 4
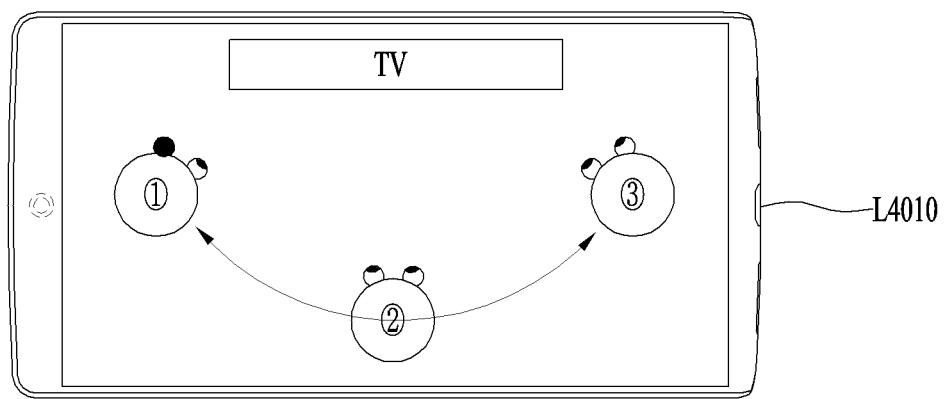
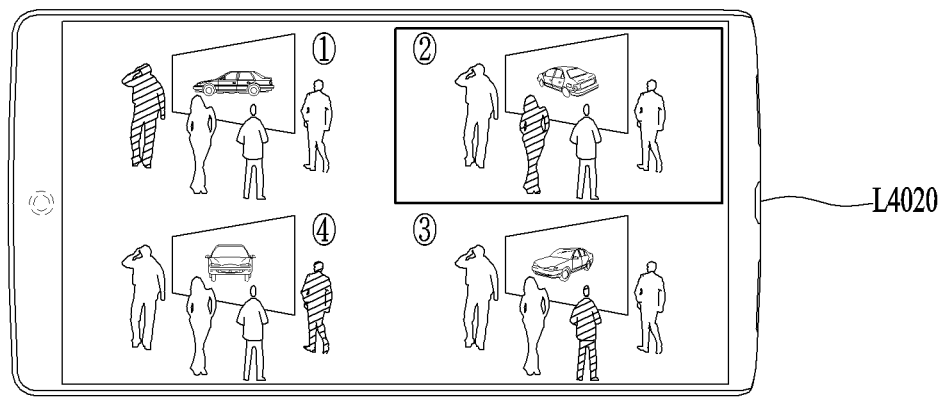

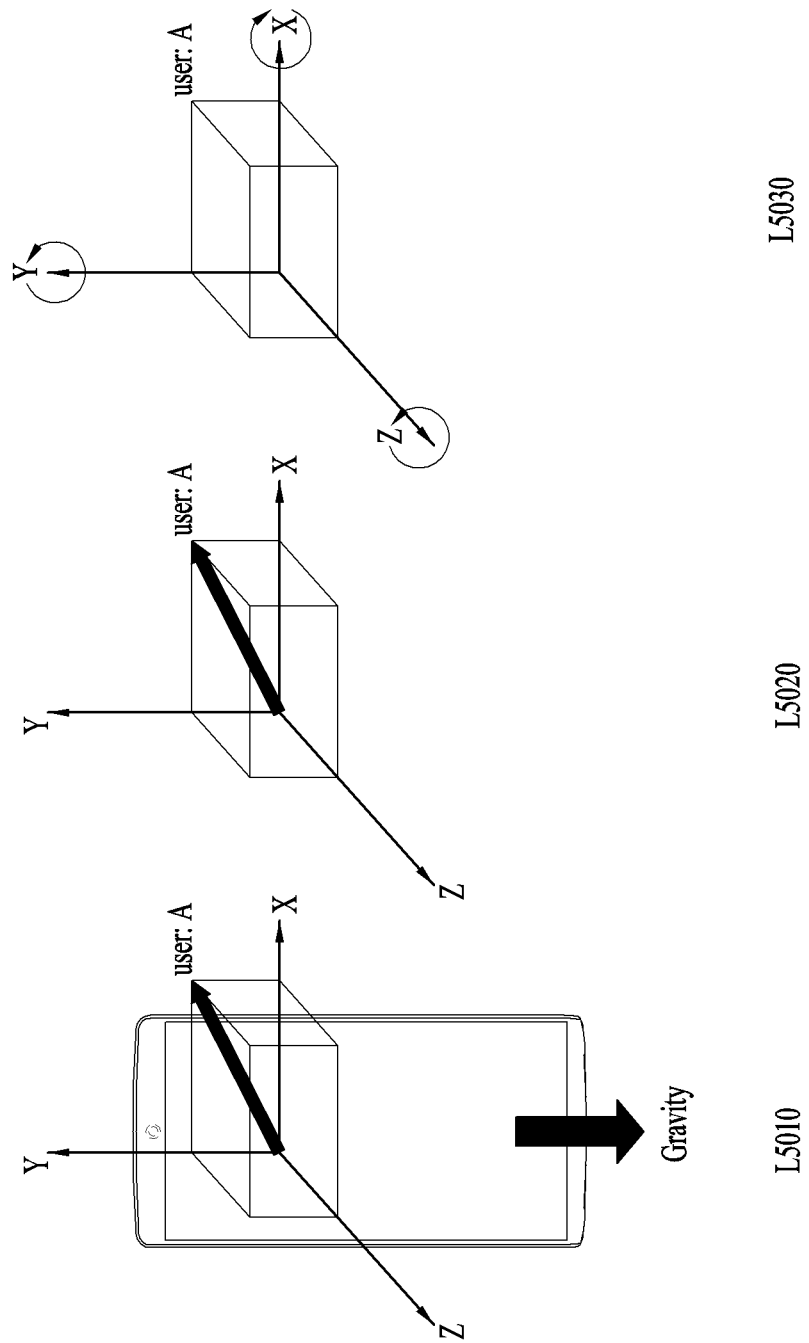

FIG. 6

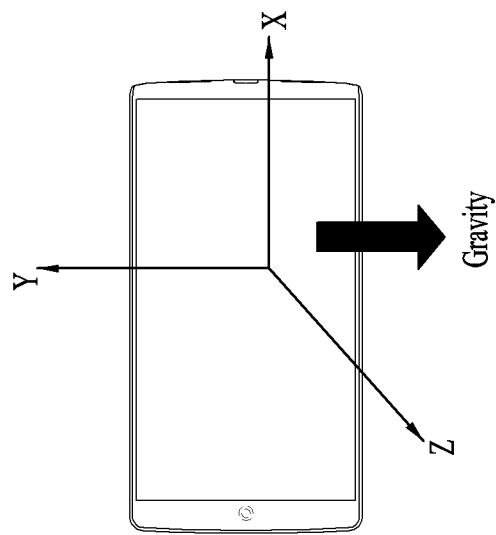

| Acceleration sensor value | Operation |
|---|---|
| $\alpha_Y > \beta > 0$ | Move the cropping region of the original image upward by $\alpha_Y$ |
| $\alpha_{-Y} > -\beta > 0$ | Move the cropping region of the original image downward by $\alpha_Y$ |
| $\alpha_X > \beta > 0$ | Move the cropping region of the original image to the left by $\alpha_X$ |
| $\alpha_{-X} > -\beta > 0$ | Move the cropping region of the original image to the right by $\alpha_X$ |
| $\alpha_Z > \beta > 0$ | Zoom in the cropping region of the original image by $\alpha_Z$ |
| $\alpha_{-Z} > -\beta > 0$ | Zoom out the cropping region of the original image by $\alpha_Z$ |

$\alpha_Y$ : Y-axis acceleration sensor value
$\alpha_X$ : Y-axis acceleration sensor value
$\alpha_Z$ : Y-axis acceleration sensor value
$\beta$ : threshold
Here, all values are positive numbers FIG. 8
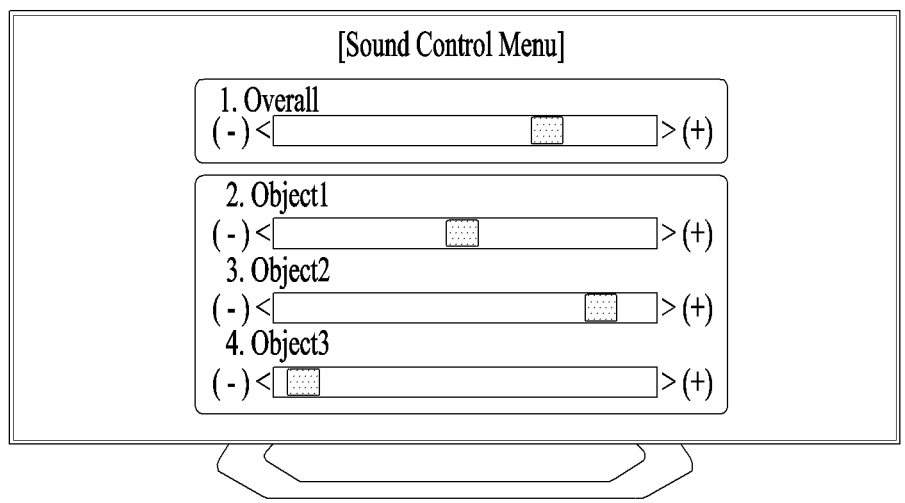
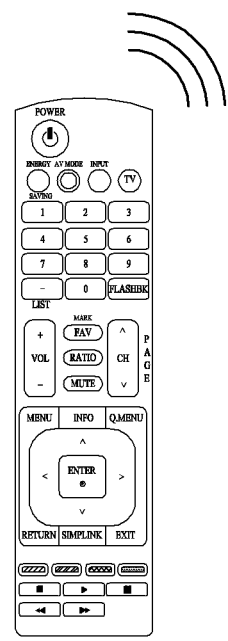

FIG. 9
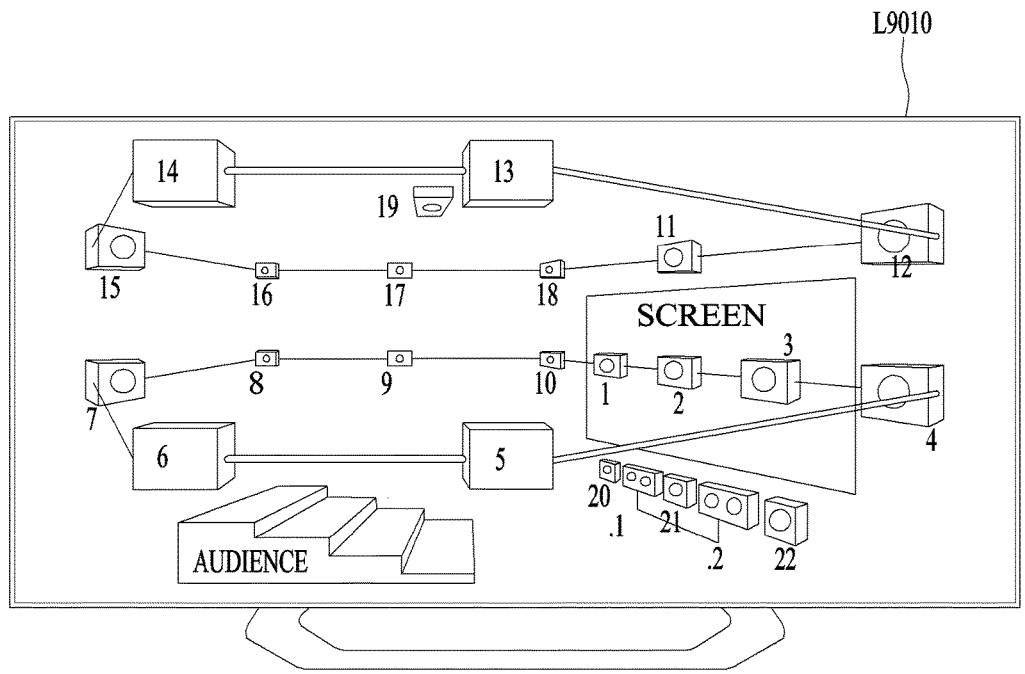
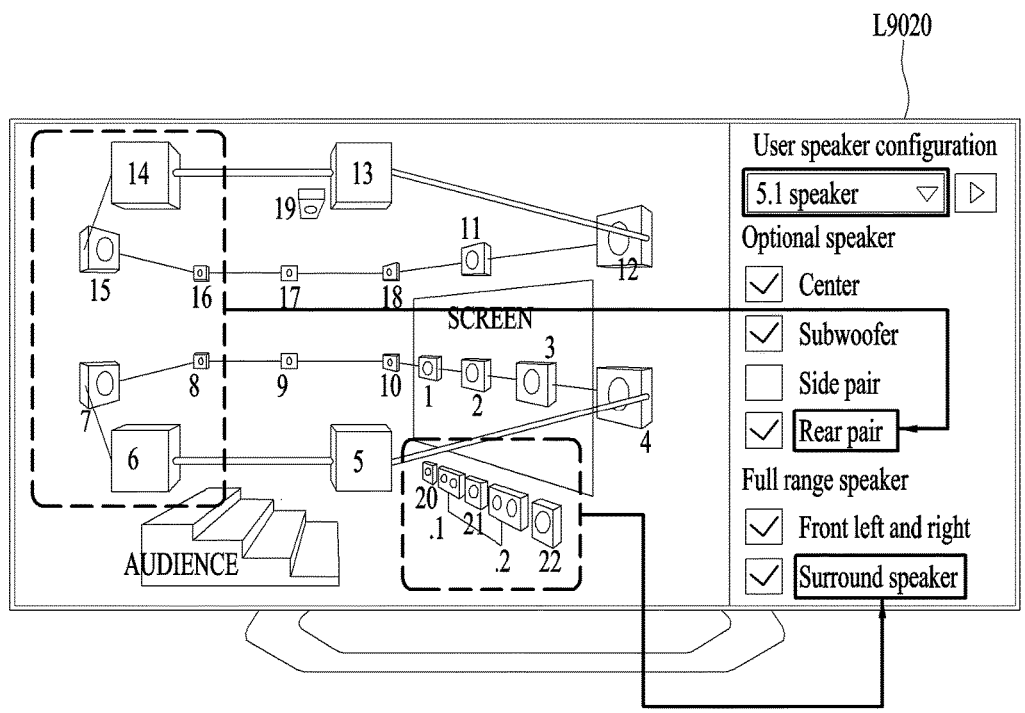

METHOD AND APPARATUS FOR PROCESSING BROADCAST DATA BY USING EXTERNAL DEVICE

CROSS REFERENCE TO RELATED APPLICATIONS

This application is the National Phase of PCT International Application No. PCT/KR2015/006711, filed on Jun. 30, 2015, which claims priority under 35 U.S.C. 119(e) to U.S. Provisional Application No. 62/019,861, filed on Jul. 1, 2014, all of which are hereby expressly incorporated by reference into the present application.

TECHNICAL FIELD

The present invention relates to processing of broadcast data. More specifically, the present invention relates to a method and an apparatus for processing broadcast data using an external device.

BACKGROUND ART

With the recent popularization of smartphones and tablets, demand for secondary devices increases. If a digital TV that receives and reproduces broadcast signals is regarded as a main device, a smartphone or a tablet of a user corresponds to a secondary device.

Meanwhile, a gyro sensor refers to a sensor that measures an orientation variation of an object using the property of maintaining an initially set direction with high accuracy irrespective of rotation of the Earth. An acceleration sensor is a sensor for measuring dynamic force of an object, such as acceleration, vibration and impact, by processing output signals. Recent secondary devices include a motion sensor such as the gyro sensor to execute additional functions using the motion sensor.

A computer interface operated through icons and a mouse, such as Windows, is referred to as a "graphical user interface (GUI)" and an interface for text input is referred to as "character user interface (CUI)". Recently, technologies for receiving various inputs from a user and outputting results using such user interfaces are under development.

Accordingly, there is increasing demand for technology for controlling a main device using a user interface of a secondary device equipped with a sensor such as a gyro sensor.

DISCLOSURE

Technical Problem

An object of the present invention devised to solve the problem lies in provision of a method of controlling a main device using a secondary device.

Another object of the present invention is to provide a method of controlling the main device using a sensor included in the secondary device.

Yet another object of the present invention is to provide a method of determining an image to be rendered through the main device using the secondary device.

Still another object of the present invention is to provide a method of adjusting the depth of an image to be displayed through the main device using the secondary device.

Another object of the present invention is to provide a method of adjusting the composition of an image to be displayed through the main device using the secondary device.

Technical Solution

An apparatus for processing broadcast data according to an embodiment includes: a receiver receiving video data and audio data; a decoder for decoding the received video data and audio data; an interface unit for transmitting, to an external device, characteristics information of the video data and the audio data and receiving, from the external device, control information for controlling display of the decoded video data and reproduction of the decoded audio data; a display for displaying the decoded video data on the basis of the received control information; and an audio reproduction unit for reproducing the decoded audio data on the basis of the received control information.

The characteristic information may include resolution information and aspect ratio information of the received video data, the control information may include sensor value information obtained through a sensor included in the external device, and the display may display part of video data indicated by the sensor value information.

When the received video data is 3D video data, the characteristic information may include depth information of the received video data, the control information may include sensor value information obtained through a sensor included in the external device, the apparatus for processing broadcast data may include a depth processor for controlling the depth of the decoded video data on the basis of the sensor value information, and the display may display the video data having the controlled depth.

When the received video data is multi-view video data, the characteristic information may include composition information of the multi-view video data, the control information may include sensor value information obtained through a sensor included in the external device, the apparatus for processing broadcast data may include a screen controller for controlling the composition of the decoded video data on the basis of the sensor value information, and the display may display the multi-view video data in the controlled composition.

When the received audio data is object based audio data, the characteristic information may include information about objects constituting the received audio data, the control information may include sensor value information obtained through a sensor included in the external device, and the audio reproduction unit may reproduce audio data having a sound per object controlled on the basis of the sensor value information.

When the received audio data is multichannel audio data, the characteristic information may include information about channels constituting the received audio data, the control information may include sensor value information obtained through a sensor included in the external device, and the audio reproduction unit may reproduce audio data having a sound per channel controlled on the basis of the sensor value information An apparatus for processing broadcast data according to another embodiment of the present invention includes: a receiver for receiving, from an external device, characteristic information of video data and audio data received by the external device; a sensor unit for detecting control information for controlling display of the received video data and reproduction of the received audio data; and a transmitter for transmitting the detected control information to the external device.

The characteristic information may include resolution information and aspect ratio information of the video data received by the external device, and the control information may include sensor value information obtained through the sensor unit.

When the video data received by the external device is 3D video data, the characteristic information may include depth information of the video data received by the external device and the control information may include sensor value information obtained through the sensor unit.

When the video data received by the external device is 3D video data, the characteristic information may include composition information of the multi-view video data and the control information may include sensor value information obtained through the sensor unit.

When the audio data received by the external device is object based audio data, the characteristic information may include information about objects constituting the received audio data and the control information may include sensor value information obtained through the sensor unit.

When the audio data received by the external device is multichannel audio data, the characteristic information may include information about channels constituting the received audio data and the control information may include sensor value information obtained through the sensor unit.

A method of processing broadcast data according to another embodiment of the present invention includes: receiving video data and audio data; decoding the received video data and audio data; transmitting, to an external device, characteristics information of the video data and the audio data and receiving, from the external device, control information for controlling display of the decoded video data and reproduction of the decoded audio data; displaying the decoded video data on the basis of the received control information; and reproducing the decoded audio data on the basis of the received control information.

A method of processing broadcast data according to another embodiment of the present invention includes: receiving, from an external device, characteristic information of video data and audio data received by the external device; detecting control information for controlling display of the received video data and reproduction of the received audio data; and transmitting the detected control information to the external device.

An apparatus for processing broadcast data according to another embodiment of the present invention includes: a receiver for receiving video data, audio data, and signaling information indicating 3D coordinate values of recommended view positions; a decoder for decoding the received video data and audio data; a photographing unit for photographing a space in which the apparatus for processing broadcast data is installed; a display for displaying the photographed image and the decoded video data, the display displaying recommended view position on the photographed image on the basis of the signaling information; and an audio reproduction unit for reproducing the decoded audio data.

Advantageous Effects

According to an embodiment of the present invention, the main device can be controlled using the secondary device.

According to another embodiment of the present invention, the main device can be controlled using a sensor mounted in the secondary device.

According to another embodiment of the present invention, an image to be rendered through the main device can be determined using the secondary device.

According to another embodiment of the present invention, the depth of an image to be displayed through the main device can be adjusted using the secondary device.

According to another embodiment of the present invention, the composition of an image to be displayed through the main device can be adjusted using the secondary device.

DESCRIPTION OF DRAWINGS

FIG. 4 illustrates a method of rendering an image of a multi-view video, desired by the user, on the main device independently of the position of the user according to another embodiment of the present invention.

FIG. 5 illustrates operation of a sensor used for a method of controlling an image to be rendered on the main device using an acceleration sensor and/or a gyro sensor included in a secondary device according to embodiments (case 2-1 and case 2-2) of the present invention.

FIG. 6 illustrates operations of the acceleration sensor included in the secondary device according to the embodiments (case 2-1 and case 2-2) of the present invention.

FIG. 8 illustrates a method of controlling a sound of each object of object-based audio according to an embodiment (case 3-1) of the present invention.

FIG. 9 illustrates a method of controlling a sound of each channel of multichannel audio according to an embodiment (case 3-2) of the present invention.

BEST MODE

Reference will now be made in detail to the preferred embodiments of the present invention, examples of which are illustrated in the accompanying drawings. However, the invention should not be limited to the specific embodiments described herein.

Although the terms used in the present invention are selected from generally known and used terms, some of the terms mentioned in the description of the present invention are selected by the applicant at his or her discretion, the detailed meanings of which are described in relevant parts of the description herein. Furthermore, it is required that the present invention is understood, not simply by the actual terms but by the meanings of each term lying within.

Figure 1:
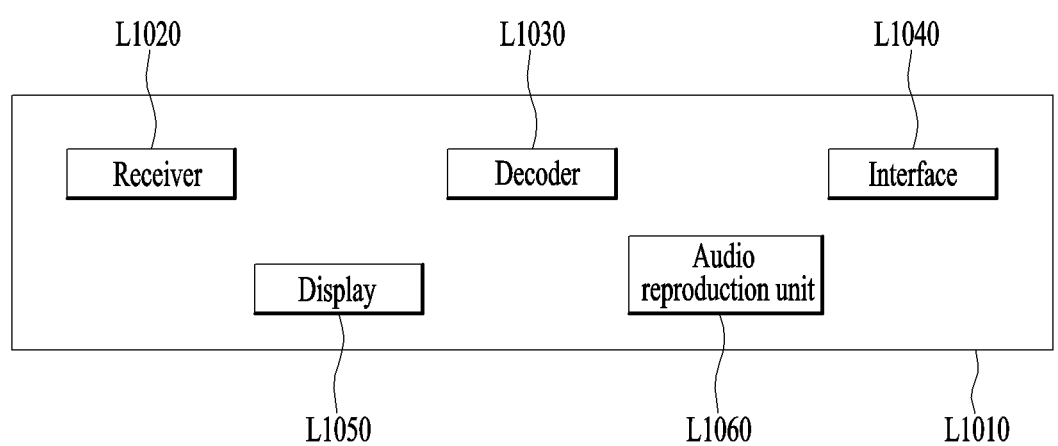
FIG. 1 illustrates a configuration of a broadcast data processing apparatus according to an embodiment of the present invention.

FIG. 1 illustrates a configuration of a broadcast data processing apparatus according to an embodiment of the present invention.

The basic concept of the present invention will now be described. Embodiment of the present invention can allow a user to control outputs of a main device and/or a speaker with respect to input video or audio such as panoramic video, 3D video and audio using a secondary device.

In an embodiment (case 1-1) of the present invention, when panoramic video or video having an aspect ratio of 21:9 is rendered on a display having an aspect ratio of 16:9, the user can directly select a portion of the panoramic video or video having an aspect ratio of 21:9. Here, the user according to an embodiment of the present invention can use a user interface (UI) of the secondary device. While a case in which panoramic video or video having an aspect ratio of 21:9 is rendered on a display having an aspect ratio of 16:9 is described as an example in the specification, the embodiment of the present invention can also be applied to a case in which video having a wider aspect ratio than a display (screen) is displayed on the display (screen).

In another embodiment (case 1-2) of the present invention, overall depth of 3D video can be controlled by the user and a portion of multi-view video desired by the user can be rendered on the main device irrespective of the position of the user. Here, the user can use a UI of the secondary device according to the embodiment of the present invention.

In another embodiment (case 2-1) of the present invention, when panoramic video or video having an aspect ratio of 21:9 is rendered on a display having an aspect ratio of 16:9 as in case 1-1, the user can directly select a portion to be rendered on the display. Here, the user can select the portion to be rendered by using an acceleration sensor and/or a gyro sensor included in the secondary device and adjusting inclination of the secondary device or moving the secondary device according to the embodiment of the present invention. The acceleration sensor and the gyro sensor will be described in detail below. While a case in which panoramic video or video having an aspect ratio of 21:9 is rendered on a display having an aspect ratio of 16:9 is described as an example in the specification, the embodiment of the present invention can be applied to a case in which video having a wider aspect ratio than a display (screen) is displayed on the display (screen).

In another embodiment (case 2-2) of the present invention, overall depth of 3D video can be controlled by the user and a portion of multi-view video desired by the user can be rendered on the main device irrespective of the position of the user, as in case 1-2. Here, the user can adjust the depth of 3D video and control a desired image of multi-view video to be rendered on the main device by using the acceleration sensor and/or the gyro sensor included in the secondary device and adjusting inclination of the secondary device or moving the secondary device according to the embodiment of the present invention.

In another embodiment (case 3-1) of the present invention, the user can control a sound of each object of object based audio. Here, the user can use a remote controller of the main device and the UI, acceleration sensor and/or gyro sensor of the secondary device according to the embodiment of the present invention.

In another embodiment (case 3-2) of the present invention, the user can control a sound of each channel of multichannel audio. Here, the user can use the remote controller of the main device and the UI, acceleration sensor and/or gyro sensor of the secondary device according to the embodiment of the present invention.

A broadcast data processing apparatus L1010 according to an embodiment of the present invention may include a receiver L1020, a decoder L1030, an interface L1040, a display L1050 and/or an audio reproduction unit L1060. The receiver L1020 can receive video data and audio data. The decoder can decode the received video data and audio data. The interface can transmit characteristic information of the video data and audio data to an external device and receive control information for controlling display of the decoded video data and reproduction of the decoded audio data from the external device. The display can display the decoded video data on the basis of the received control information. The audio reproduction unit can reproduce the decoded audio data on the basis of the received control information. Here, the external device may be the secondary device and the broadcast data processing apparatus L1010 may be the main device.

According to another embodiment of the present invention, the characteristic information may include resolution information and aspect ratio information of the received video data. The control information may include sensor value information obtained through a sensor included in the external device. The display can display part of video data, indicated by the sensor value information. Here, the sensor value information may indicate coordinate variations. This will be described in detail below with reference to FIG. 2.

According to another embodiment of the present invention, when the received video data is 3D video data, the characteristic information may include depth information of the received video data and the control information may include sensor value information sensed through a sensor included in the external device. In this case, the broadcast data processing apparatus L1010 may include a depth processor for adjusting the depth of the decoded video data on the basis of the sensor value information, and the display may display the video data having the adjusted depth. Here, the depth processor can execute the same function as a depth control processor which will be described below. This will be described in detail below with reference to FIGS. 3 and 7.

According to another embodiment of the present invention, when the received video data is multi-view video data, the characteristic information may include composition information of the multi-view video data and the control information may include sensor value information obtained through a sensor included in the external device. In this case, the broadcast data processing apparatus L1010 may include a screen controller for controlling the composition of the multi-view video data on the basis of the sensor value information, and the display may display the multi-view video data. Here, the screen controller can execute the same function as a multi-view image selection processor which will be described below. The composition information can represent the composition of images forming multiple views. This will be described in detail below with reference to FIGS. 3, 4 and 7.

According to another embodiment of the present invention, when the received audio data is object based audio data, the characteristic information may include information about objects constituting the received audio data, the control information may include sensor value information obtained through a sensor included in the external device, and the audio reproduction unit can reproduce audio data having a sound per object adjusted based on the sensor value information. This will be described in detail below with reference to FIG. 8.

According to another embodiment of the present invention, when the received audio data is multichannel audio data, the characteristic information may include information about channels constituting the received audio data, the control information may include sensor value information obtained through a sensor included in the external device, and the audio reproduction unit can reproduce audio data having a sound per channel adjusted based on the sensor value information. This will be described in detail below with reference to FIG. 9.

Figure 2:
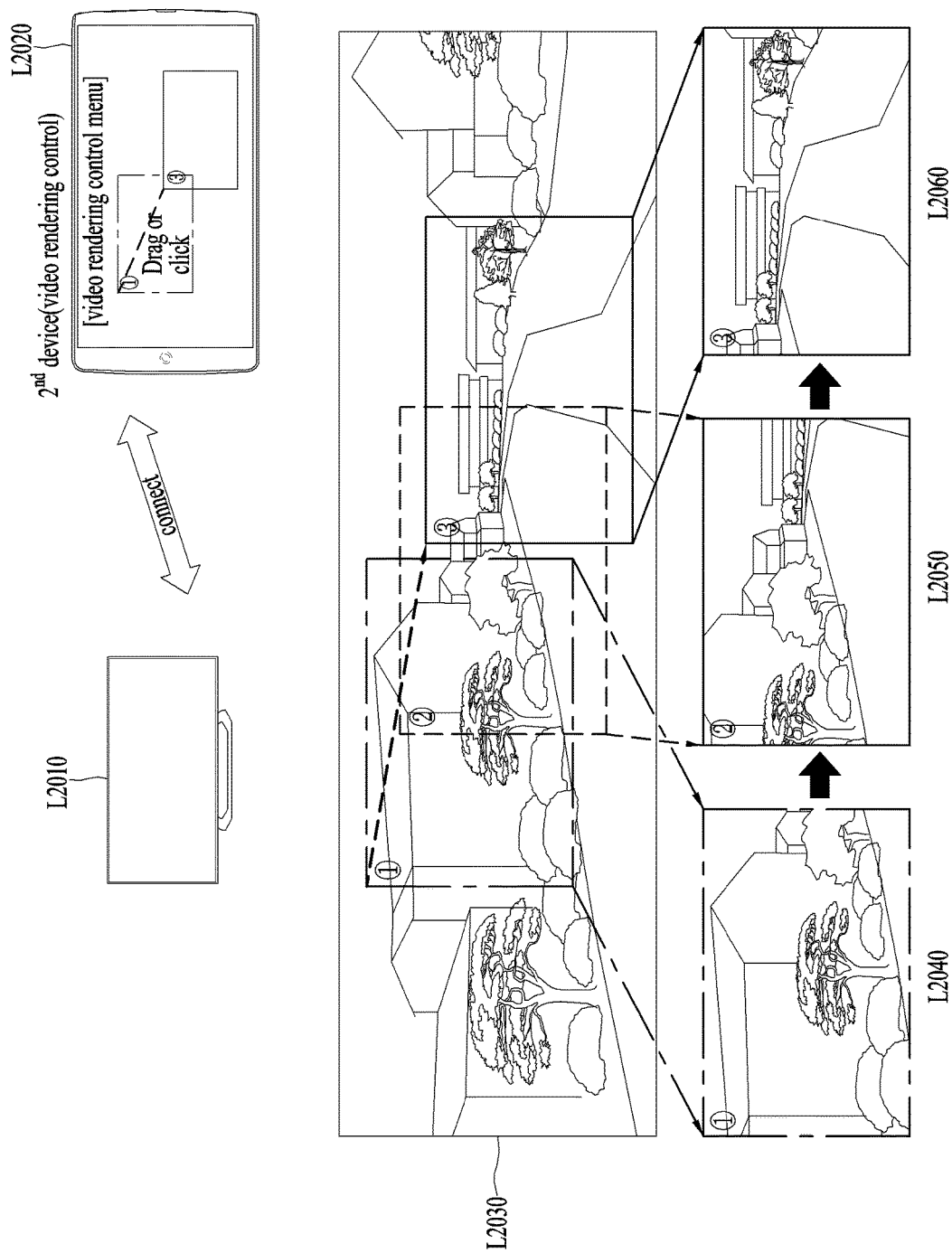
FIG. 2 illustrates a method of selecting, by a user, a region of a panoramic video or a video having an aspect ratio of 21:9, which will be rendered on a display having an aspect ratio of 16:9, according to an embodiment (case 1-1) of the present invention.

FIG. 2 illustrates a method of selecting, by a user, a region of a panoramic video or a video having an aspect ratio of 21:9, which will be rendered on a display having an aspect ratio of 16:9, according to the embodiment (case 1-1) of the present invention.

The present embodiment can connect a main device L2010 and a secondary device L2020, execute an application and control video rendering using the secondary device.

The main device L2010 according to the embodiment of the present invention can transmit, to the secondary device L2020, resolution information and/or aspect ratio information of an image (video) received from a transmitting end. In addition, the main device L2010 can transmit, to the secondary device, coordinate values of a portion of the received image, which is rendered through the main device by default.

The secondary device L2020 according to an embodiment of the present invention can transmit, to the main device, a sensor on/off command and/or coordinate variation values of a portion to be rendered through the main device. Here, the coordinate variation values can represent coordinate values input by the user.

In FIG. 2, a box (box 1) denoted by 1 can indicate a portion of the image received from the transmitting end, which is set to initial values (default values) prior to control of the user and will be rendered through the main device. A box (box 2) denoted by 2 can indicate an intermediate portion for connecting the portion to be initially rendered and a new portion to be rendered when the user drags the image to the new portion. A box (box 3) denoted by 3 can indicate a final portion which corresponds to the new portion selected by the user and is rendered through the main device upon selection of the user.

In FIG. 2, L2030 can represent a panoramic video or a video having an aspect ratio of 21:9 which needs to be decoded by the main device. According to an embodiment of the present invention, box 3 included in the image L2030 is the portion that needs to be decoded and rendered by the main device.

The concept of the present embodiment (case 1-1) will now be described in detail. In the present embodiment, the user can directly select a portion of the panoramic video or video having an aspect ratio of 21:9, which will be rendered through the display. Here, the user can use a UI of the secondary device according to the present embodiment. If the aspect ratio of the main device is 16:9, the present embodiment can be applied to any case in which an image having a wider aspect ratio than 16:9 is received. According to another embodiment of the present invention, a box displayed on the secondary device, which indicates a portion to be rendered through the main device, can be scaled through a UI without being fixed. That is, the user can freely adjust the aspect ratio of an image to be rendered through the main device using the secondary device according to the present embodiment. Accordingly, an image to be rendered through the main device is determined by controlling the number of pixels included in the box of the secondary device instead of scaling through aspect ratio adjustment, reducing image distortion.

A process according to the present embodiment (case 1-1) will now be described. The present embodiment can connect the main device and the secondary device and execute an application for controlling an image to be rendered in the secondary device. The user can select a video rendering control menu using the UI in the application according to the present embodiment. The secondary device according to the present embodiment can receive, from the main device, resolution information and/or aspect ratio information of an image received by the main device from a transmitting end. Then, the secondary device can display the image on the basis of the resolution information and the aspect ratio information through the UI. Here, the image received by the main device may be decoded and displayed on the secondary device. Alternatively, the secondary device may receive a down-sampled image in a low resolution from the main device and display the down-sampled image on the screen thereof. If the image received by the main device is a stream using a scalable video codec, the secondary device according to the present embodiment can display the entire image of a base layer or a sub-sampled image of the entire image of the base layer on the screen. The secondary device can display a portion rendered through the main device in the form of a box on the screen. Here, the size of the box can be adjusted by the user as described above in another embodiment of the present invention. If the box size has been adjusted by the user and the aspect ratio of the adjusted box differs from the aspect ratio of the main device, the main device can scale a cropped image or perform processes such as active format description (AFD) and/or bar data insertion on the cropped image and then display a final image on the screen thereof. In this manner, the user can control video rendering on the main device using the secondary device by dragging and/or clicking the box according to the present embodiment. Referring to FIG. 2, images L2040, L2050 and L2060 can be linearly rendered in the direction of the arrow. In this case, the user can control a portion to be rendered using the secondary device by dragging the box and render a desired portion by selecting a region closest to the desired portion from among divided regions of the image according to the present embodiment. Here, the UI according to the present embodiment divides the image such that the user can select a divided portion of the image. According to the present embodiment, when the user selects a desired region to be rendered, the region can be maintained. In addition, even when the main device decodes the entire image, the secondary device can display only the region of the image, selected by the user.

Figure 3:
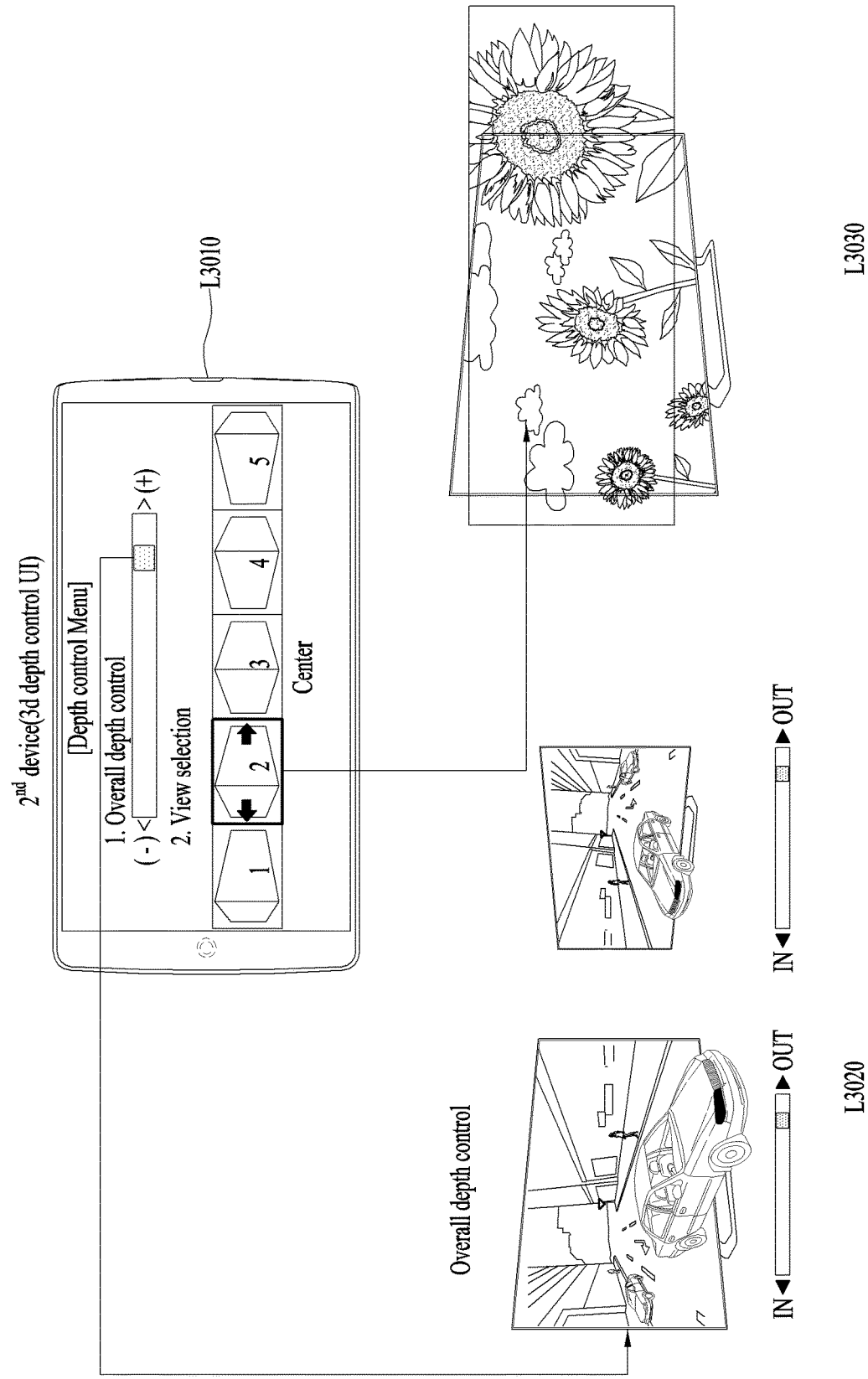
FIG. 3 illustrates a method of controlling, by a user, the depth of a 3D video and a method of rendering an image of a multi-view video, desired by the user, through the main device independently of the position of the user according to an embodiment (case 1-2) of the present invention.

FIG. 3 illustrates a method of controlling, by a user, the depth of a 3D video and a method of displaying an image of a multi-view video, desired by the user, through the main device independently of the position of the user according to an embodiment (case 1-2) of the present invention.

Referring to the bottom left part L3030 of the figure, the user can control the depth of the 3D video to reflect his or her taste according to the present embodiment. The user can freely select a depth that produces less fatigue, a depth that produces powerful 3D effect or the like to reflect his or her taste in images. The user can control positive/negative directions of a depth using the secondary device L3010 according to the present embodiment.

Referring to the bottom right part L3030 of the figure, the user can select an environment for viewing images or select a rendered image without changing the position at which the user views images according to the present embodiment. Here, the user can control the orientation of a rendered image through the UI of the secondary device according to the present embodiment. For example, when the user selects menu #2 through the UI shown in the figure, a left image and a right image can be rendered on the basis of view position #2 on the main device.

The concept of the present embodiment (case 1-2) will now be described in detail. According to the present embodiment, the user can perform overall depth control, select an environment for viewing images and control an image for the selected environment to be rendered. Here, the user can directly use the secondary device according to the present embodiment.

A description will be given of processes according to the present embodiment (case 102). The present embodiment can connect the main device to the secondary device and execute an application for controlling rendered images in the secondary device. The user can select a video rendering control menu for controlling rendered images using the UI through the application according to the present embodiment. The secondary device according to the present embodiment can receive, from the main device, depth information and/or composition information of images received by the main device from a transmitting end. The secondary device according to the present embodiment can display information for depth control and/or view selection through the UI. According to the present embodiment, when desired depth information of the user is input through the secondary device, a three-dimensional effect of an image can be controlled. In the present embodiment, even an image that cannot be viewed by the user at the position of the user can be rendered on the main device through the secondary device upon input of a desired image of the user. That is, the user can select an image of a desired view from among images of various views through the UI of the secondary device and view the image at the current location for viewing images. According to another embodiment of the present invention, the user can view an image corresponding to the current location for viewing images through the main device and simultaneously watch an image of a different view through the secondary device. Another embodiment of the present invention can render previously set images at positions other than the current position for viewing images. According to another embodiment of the present invention, the user can directly set images for various positions for viewing images and control a newly set image to be rendered at each position. That is, according to the present embodiment, multiple users can simultaneously view desired images at their positions. According to another embodiment of the present invention, the user can determine the contents of an image to be rendered on the main device using the secondary device and maintain the area and depth of the image to be rendered on the main device and/or images for a selected position for viewing images until the contents are changed.

FIG. 4 illustrates a method of rendering a desired image of the user, from a multi-view video, on the main device independently of the position of the user according to another embodiment of the present invention.

Referring to the upper part L4010 of the figure, the user can change and/or select an image corresponding to a view position #1, an image corresponding to a view position #2 and/or an image corresponding to a view position #3 irrespective of his or her position according to the present embodiment. The user can change and/or select the image corresponding to each view position by linearly moving the image according to the present embodiment. Here, the user can select not only the images corresponding to the view positions #1, #2 and #3 but also an image corresponding to any position on the line indicated by an arrow. When the user changes images corresponding to view positions through the UI, intermediate images for the images corresponding to the view positions #1 and #3 can be rendered on the main device such that the images can be linearly connected from the image corresponding to the view position #1 to the image corresponding to the view position #3 according to the present embodiment. Here, virtual view images corresponding to the intermediate images can be generated from the multi-view video and rendered on the main device according to the present embodiment.

Referring to the lower part L4020 of the figure, images corresponding to view positions can be modeled and/or numbered such that the user can select the images according to the present embodiment. If the user selects the view position #2 through the UI although the user actually sits at the view position #1 (leftmost position), the image corresponding to the view position #2 can be rendered on the main device according to the present embodiment.

According to another embodiment of the present invention, the UI illustrated in the figure may additionally include a menu for changing positions of a left view and a right view constituting a 3D video and/or a menu for converting a 2D video into a 3D video.

FIG. 5 illustrates operation of a sensor used for a method of controlling an image to be rendered on the main device using an acceleration sensor and/or a gyro sensor included in the secondary device according to embodiments (case 2-1 and case 2-2) of the present invention.

The embodiments (case 2-1 and case 2-2) of the present invention can use a gravity sensor, an acceleration sensor and/or a gyro sensor to detect motion of the secondary device.

The gravity sensor L5010 according to the embodiments of the present invention can detect the orientation of the secondary device and thus a rendered image can be corrected on the basis of the detected orientation.

The acceleration sensor L5020 according to the embodiments of the present invention can sense velocity variation, impact, and strength of force when the secondary device moves, and thus a rendered image can be corrected using sensing results. The acceleration sensor according to the embodiments of the present invention can divide gravitational acceleration acting thereon into three vectors of X-, Y- and Z-axis directions and measure the magnitude of the gravitational acceleration. Here, the X-axis indicates the horizontal axis of the device screen, the Y-axis indicates the vertical axis of the device screen and the Z-axis indicates a direction above the device screen. The positive direction of the X-axis corresponds to the right, the positive direction of the Y-axis corresponds to the left and the positive direction of the Z-axis is a direction facing up from the device screen. An output value of the acceleration sensor has a vector form having three elements of <a_x, a_y, a_z>.

The gyro sensor L5030 according to the embodiments of the present invention can detect tilting of the secondary device by sensing rotation of the secondary device in three axes. The gyro sensor includes the three axes for sensing rotation in addition to the X-axis, Y-axis and Z-axis of the acceleration sensor. Accordingly, the gyro sensor can sense motion more precisely than the acceleration sensor. The gyro sensor can calculate an angular velocity indicating the amount of rotation per unit time on the basis of one axis. Then, the gyro sensor can measure an angle (inclination, movement angle or the like) by integrating the calculated angular velocity. When the gyro sensor rotates, the angular velocity of the X-axis, Y-axis and Z-axis changes and the gyro sensor can measure the angular velocity variation. Accordingly, the output value of the gyro sensor indicates a movement angle corresponding to the value obtained by integrating the angular velocity. That is, the gyro sensor can directly sense height, rotation and inclination whereas the acceleration sensor simply senses acceleration/deceleration in three axes.

The embodiments of the present invention can use a motion recognition sensor in addition to the aforementioned sensors. The motion recognition sensor senses a motion or position of an object and is a composite sensor including various sensors such as a geo-magnetic sensor and an acceleration sensor, an altimeter, a gyro and the like, which are integrated into one chip.

FIG. 6 illustrates operations of the acceleration sensor included in the secondary device according to the embodiments (case 2-1 and case 2-2) of the present invention.

FIG. 6 illustrates a case in which the secondary device control image rendering using the acceleration sensor when the main device receives a panoramic image and/or a video having an aspect ratio of 21:9. FIG. 6 shows acceleration sensor values and device operations when motion occurs in respective axial directions. Even when motion is generated in a direction other than axial directions, the present embodiment can pre-define device operations corresponding to acceleration sensor values to control a rendered image requested by the user. When the gyro sensor is used according to another embodiment of the present invention, a device operation corresponding to inclination of the secondary device can be pre-defined on the basis of an angular velocity corresponding to each axis. Even when the overall depth of a video is controlled or a view is selected from a multi-view video according to another embodiment of the present invention, device operations corresponding to motion values extracted on the basis of the acceleration sensor and/or the gyro sensor included in the secondary device can be pre-defined, as shown in the table of FIG. 6.

When the main device receives a 2D image, the embodiments of the present invention can calculate or map coordinate values of a region to be rendered on the main device from among the received image on the basis of motion and/or inclination information obtained using the acceleration sensor and/or the gyro sensor included in the secondary device. In addition, the present embodiment can crop or scale the region to be rendered on the main device on the basis of the calculated coordinate values and render the cropped or scaled region on the main device.

When the main device receives a 3D image, the embodiments of the present invention can control the depth or select an image to be viewed from the received image on the basis of motion and/or inclination information obtained using the acceleration sensor and/or the gyro sensor included in the secondary device. For example, when the user moves the smartphone to the right, this operation can be interpreted as user's intention to go to the right of the screen of the main device and a view captured at the left of the current position can be rendered on the main device according to the embodiments of the present invention. When the user moves the smartphone toward the screen of the main device, this operation can be interpreted as user's intention to reduce the overall depth of the image and the overall depth can be reduced.

The concept of the embodiment (case 2-1) of the present invention will now be described in detail. When the user moves or tilts the secondary device forward and backward, to the left and right or up and down, the motion and/or inclination of the secondary device can be detected through the acceleration sensor and/or the gyro sensor included in the secondary device, and a region to be actually rendered can be selected from a panoramic video or a 21:9 video received by the main device on the basis of the detected motion and/or inclination of the secondary device according to the embodiment of the present invention.

The concept of the embodiment (case 2-2) of the present invention will now be described in detail. When the user moves or tilts the secondary device forward and backward, to the left and right or up and down, the motion and/or inclination of the secondary device can be detected through the acceleration sensor and/or the gyro sensor included in the secondary device, and the depth of a 3D image received by the main device or an image to be viewed can be selected from a received multi-view image on the basis of the detected motion and/or inclination of the secondary device according to the embodiment of the present invention.

A description will be given of processes of the embodiments (case 2-1 and case 2-2) of the present invention. The main device can be connected to the secondary device and an application for controlling a rendered image can be executed in the secondary device in the embodiments of the present invention. The user can select a video rendering control menu for controlling a rendered image using the acceleration sensor through the application according to the embodiments of the present invention. Operation of the main device according to motion and/or inclination of the acceleration sensor and/or the gyro sensor can be defined as a default value in the embodiments of the present invention. Here, the operation of the main device according to motion of the sensor may be set by the user. In the embodiments of the present invention, information about the operation of the main device according to the motion of the sensor can be displayed on the device screen in the form of "Help". The secondary device according to the embodiments of the present invention can detect characteristics of an image decoded by the main device, perform cropping, scaling, depth control and/or view selection on the basis of motion and/or inclination information of the acceleration sensor and/or the gyro sensor and deliver information about the performed operations to the main device. Here, the characteristics of the image decoded by the main device, detected by the secondary device, may be information indicating a panoramic video, a 21:9 video, a 2D video, a 3D video or a multi-view video. The cropping operation can be performed according to a predetermined main device operation based on a motion and/or inclination of the acceleration sensor and/or the gyro sensor. The main device according to the embodiments of the present invention can render a corresponding image on the basis of a request of the user, delivered from the secondary device. In this case, when the user determines a desired region to be rendered, depth and an image to be rendered using the secondary device and turns off the sensor, the determined region, depth and image can be maintained.

Figure 7:
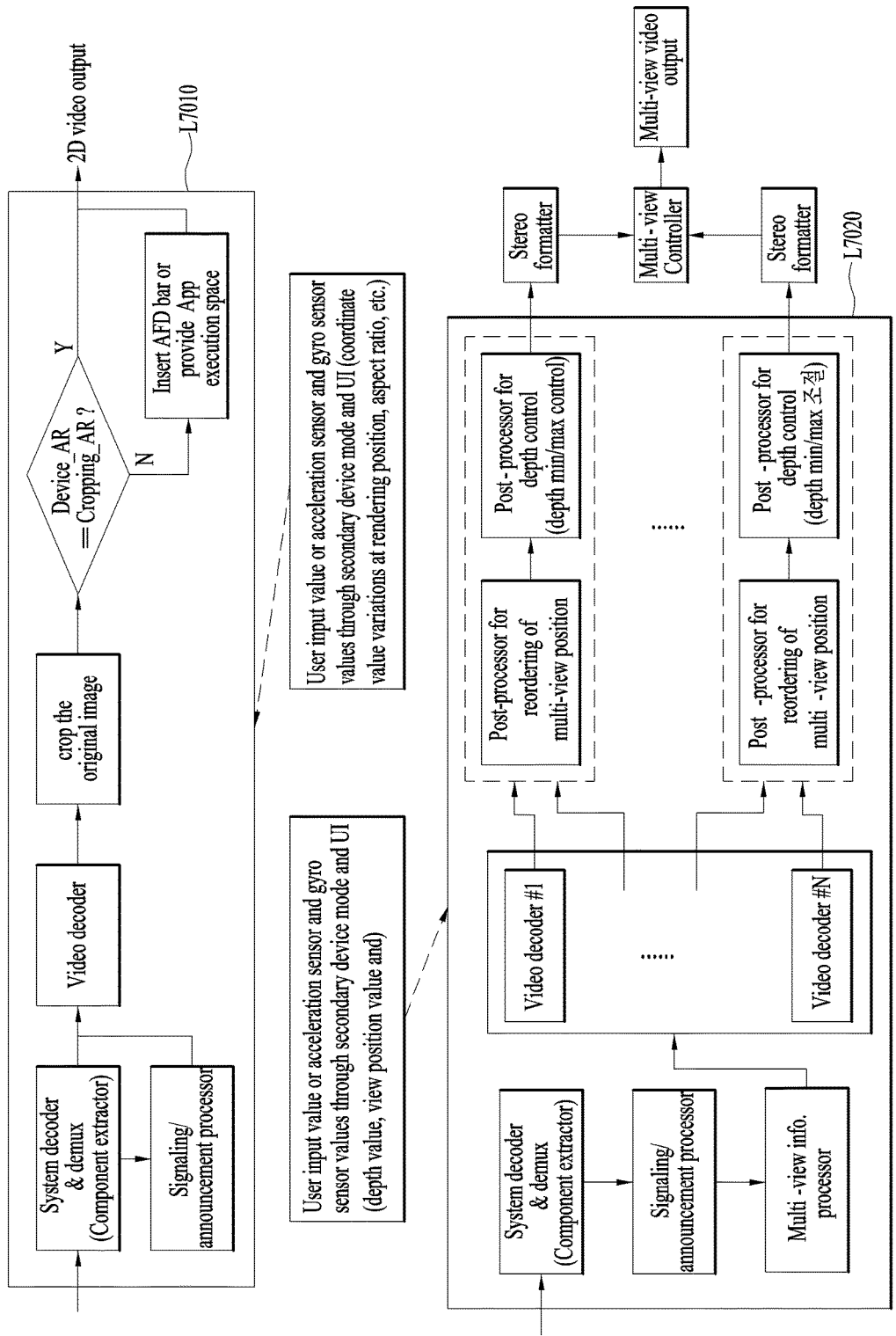
FIG. 7 illustrates a configuration of an apparatus for receiving broadcast signals according to an embodiment of the present invention.

FIG. 7 illustrates a configuration of an apparatus for receiving a broadcast signal according to an embodiment of the present invention.

An apparatus L7010 for receiving a 2D broadcast signal according to an embodiment of the present invention may include a system decoder, a demultiplexer, a component extractor, a signaling/announcement processor and/or a video decoder.

The system decoder and the demultiplexer can demultiplex a multiplexed broadcast signal transmitted from a transmitting end and extract data packets included in the broadcast signal. The component extractor can extract components from the received broadcast signal. Here, the components may include a video component, an audio component and the like. The signaling/announcement processor serves as a PSI/SI/PSIP processor to process signaling information. The video decoder can decode a video.

The apparatus L7010 for receiving a 2D broadcast signal according to the embodiment of the present invention can receive a value input by the user, an acceleration sensor value and/or a gyro sensor value from the secondary device. The value input by the user, the acceleration sensor value and/or the gyro sensor value may indicate a variation in coordinate values of a region to be rendered through the main device, aspect ratio information of an image and/or aspect ratio information of the main device. The reception apparatus L7010 can crop the original image received from the transmitting end using the values received from the secondary device. In addition, the reception apparatus L7010 can render the cropped image through the main device when the aspect ratio of the cropped image is identical to the aspect ratio of the main device and insert an AFD bar or an application execution space in a blank of the screen when the aspect ratio of the cropped image differs from the aspect ratio of the main device.

An apparatus L7010 for receiving a 3D broadcast signal according to an embodiment of the present invention may include a system decoder, a demultiplexer, a component extractor, a signaling/announcement processor, a video decoder, a post-processor for reordering of multi-view position, a post-processor for depth control, a stereo formatter and/or a multi-view controller.

The system decoder, demultiplexer, component extractor, signaling/announcement processor and/or video decoder can execute the same functions as those of the corresponding components of the apparatus L7010 for receiving a 2D broadcast signal. However, the apparatus L7010 for receiving a 3D broadcast signal can include one or more video decoders. The apparatus L7020 for receiving a 3D broadcast signal according to an embodiment of the present invention can receive a value input by the user, an acceleration sensor value and/or a gyro sensor value from the secondary device. The value input by the user, the acceleration sensor value and/or the gyro sensor value may indicate a depth value of a multi-view video received by the main device, information about a desired image of the user in the received multi-view video, and the like. The post-processor for reordering of multi-view position can set a corresponding view using the information about the desired image of the user in the received multi-view video, received from the secondary device. The post-processor for depth control can set a corresponding depth using the depth value received from the secondary device. The stereo formatter can perform formatting for video rendering. The multi-view controller can combine images with respect to one or more views.

The apparatus L7010 for receiving a 2D broadcast signal and/or the apparatus L7020 for receiving a 3D broadcast signal according to the embodiments of the present invention can correspond to the main device.

FIG. 8 illustrates a method of controlling a sound of each object of object based audio according to an embodiment (case 3-1) of the present invention.

When object based audio is provided according to the embodiment of the present invention, an object sound control menu L8010 can be executed and information about the entire object sound can be schematically displayed to the user in the embodiment of the present invention. To this end, the embodiment of the present invention can add buttons for controlling sound on an object basis to a remote controller L8020 shown in the figure and add a UI corresponding to the object sound control menu to the device. In this case, existing buttons and/or UI for volume control can be maintained. According to the embodiment of the present invention, when a magic remote controller is employed, the UI may be generated in the main device and displayed on the screen of the main device and sound may be controlled on an object-by-object basis by controlling the UI displayed on the screen using the magic remote controller. According to another embodiment of the present invention, sound can be controlled on an object-by-object basis using the secondary device. In this case, the UI of the secondary device and/or the acceleration sensor and/or the gyro sensor included in the secondary device can be used.

For example, when a sports broadcast is served, object 1 can indicate the voice of a sports broadcast announcer, object 2 can indicate voices of players in the stadium and object 3 can indicate sounds of audience in FIG. 8. In this case, the sounds of object 3 can be muted according to the embodiment of the present invention if the user does not want to hear the sounds of the audience.

If a music broadcast is served, object 1 can indicate instrumental accompaniment and objects 2 and 3 can indicate voices of singers in FIG. 8. In this case, when the user wants to increase the volume of the instrumental accompaniment, the sound of object 1 can be increased and the sounds of other objects can be reduced or maintained according to the embodiment of the present invention.

FIG. 9 illustrates a method of controlling sound of each channel of multichannel audio according to an embodiment (case 3-2) of the present invention.

When multichannel audio is provided, a schematic diagram L9010 illustrating an audio system for the multichannel audio from a transmitting end can be displayed using a UI and a difference between the audio system of the user and the audio system recommended by the transmitting end can be displayed according to the embodiment of the present invention.

When the transmitting end provides 22.2 channel audio, a schematic diagram of an audio system can be displayed on the main device and/or the secondary device according to the embodiment of the present invention. In this case, the main device and/or the secondary device can display a speaker that is not provided by the audio system of the user by directly receiving signals from a speaker of the user (e.g., using Bluetooth) or according to the audio system previously input by the user.

According to the embodiment of the present invention, when an audio system provided by a broadcasting station differs from the audio system of the user, the user can map audio to his or her audio system. For example, if a user having a 5.1 channel audio system is provided with a 22.2 channel audio broadcast program, the user can map 22.2 channels to 5.1 channels as illustrated in the lower part L9020 of FIG. 9. That is, audio from speakers included in a box indicated by a dotted line in L9020 from among the entire 22.2 channels can be mapped to the audio of the user.

According to the embodiment of the present invention, information about the audio system provided by the broadcasting station can be transmitted to a receiving end. In addition, the embodiment of the present invention can collect information about speaker arrangements in audio systems of users and deliver the collected information to the device.

When multichannel audio is provided, the embodiment of the present invention can execute a channel sound control menu and schematically display all provided channels to the user. To this end, the embodiment of the present invention can add buttons for controlling sound on a channel-by-channel basis to a remote controller and add a UI corresponding to the channel sound control menu to the device. In this case, existing buttons and/or a UI for volume control can be maintained. According to the embodiment of the present invention, when a magic remote controller is employed, the UI may be generated in the main device and displayed on the screen of the main device and sound may be controlled on a channel-by-channel basis by controlling the UI displayed on the screen using the magic remote controller. According to another embodiment of the present invention, sound can be controlled on a channel-by-channel basis using the secondary device. In this case, the UI of the secondary device and/or the acceleration sensor and/or the gyro sensor included in the secondary device can be used.

Figure 10:
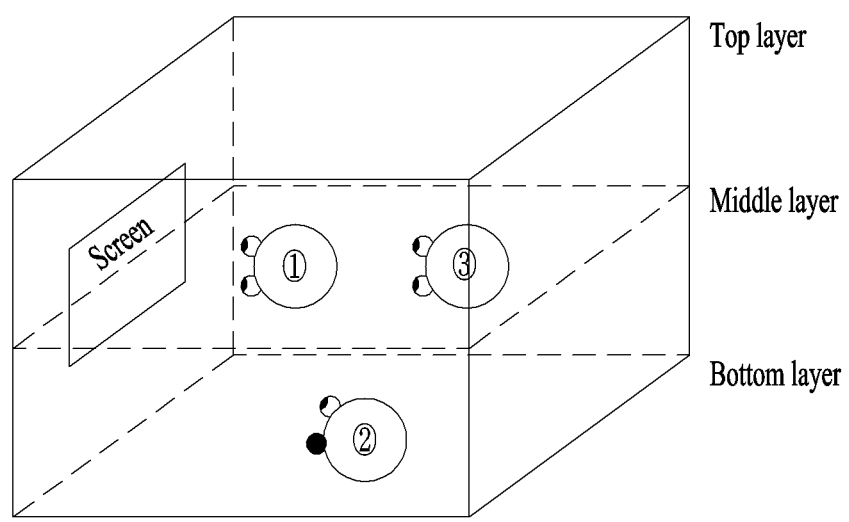
FIG. 10 illustrates a method of providing information about a best position for viewing broadcast services according to an embodiment of the present invention.

FIG. 10 illustrates a method of providing information about a best position for viewing a broadcast service according to an embodiment of the present invention.

A device according to the embodiment of the present invention can photograph an actual space in which a screen is installed using a camera. Then, the device can display the photographed image on the screen and indicate the best position for viewing the broadcast service.

The embodiment of the present invention can display the actual space in which the screen is installed on the screen as a 3D graphical image. Then, the device can display the best view position intended by a producer and indicate recommended view positions to the user. In this case, information about the best view position and/or recommended view positions can be delivered to the device in the form of spatial coordinate information through signaling.

Figure 11:
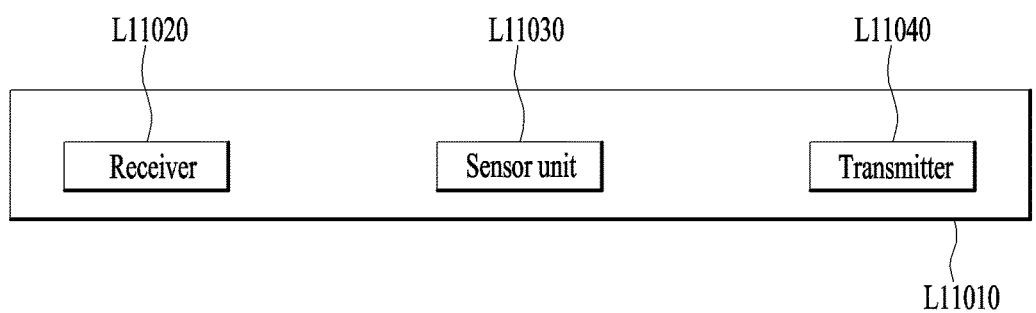
FIG. 11 illustrates a configuration of a broadcast data processing apparatus according to an embodiment of the present invention.

FIG. 11 illustrates a configuration of a broadcast data processing apparatus according to an embodiment of the present invention.

The broadcast data processing apparatus L11010 according to another embodiment of the present invention may include a receiver L11020, a sensor unit L11030 and/or a transmitter L11040. The receiver can receive, from an external device, characteristic information of video data and audio data received by the external device. The sensor unit can sense control information for controlling display of the received video data and reproduction of the received audio data. The transmitter can transmit the sensed control information to the external device. Here, the external device may be the main device and the broadcast data processing apparatus L11010 may be the secondary device.

According to another embodiment of the present invention, the characteristic information may include resolution information and aspect ratio information of the video data received by the external device and the control information may include sensor value information obtained by the sensor unit. This has been described in detail above with reference to FIG. 2.

According to another embodiment of the present invention, when the video data received by the external device is 3D video data, the characteristic information may include depth information of the video data received by the external device and the control information may include sensor value information obtained through the sensor unit. This has been described above with reference to FIGS. 3 and 7.

According to another embodiment, when the video data received by the external device is multi-view video data, the characteristic information may include composition information of the multi-view video data and the control information may include sensor value information obtained through the sensor unit. This has been described above with reference to FIGS. 3, 4 and 7.

According to another embodiment, when the audio data received by the external device is object based audio data, the characteristic information may include information about objects constituting the audio data received by the external device and the control information may include sensor value information obtained through the sensor unit. This has been described above with reference to FIG. 8.

According to another embodiment, when the audio data received by the external device is multichannel audio data, the characteristic information may include information about channels constituting the audio data received by the external device and the control information may include sensor value information obtained through the sensor unit. This has been described above with reference to FIG. 9.

Figure 12:
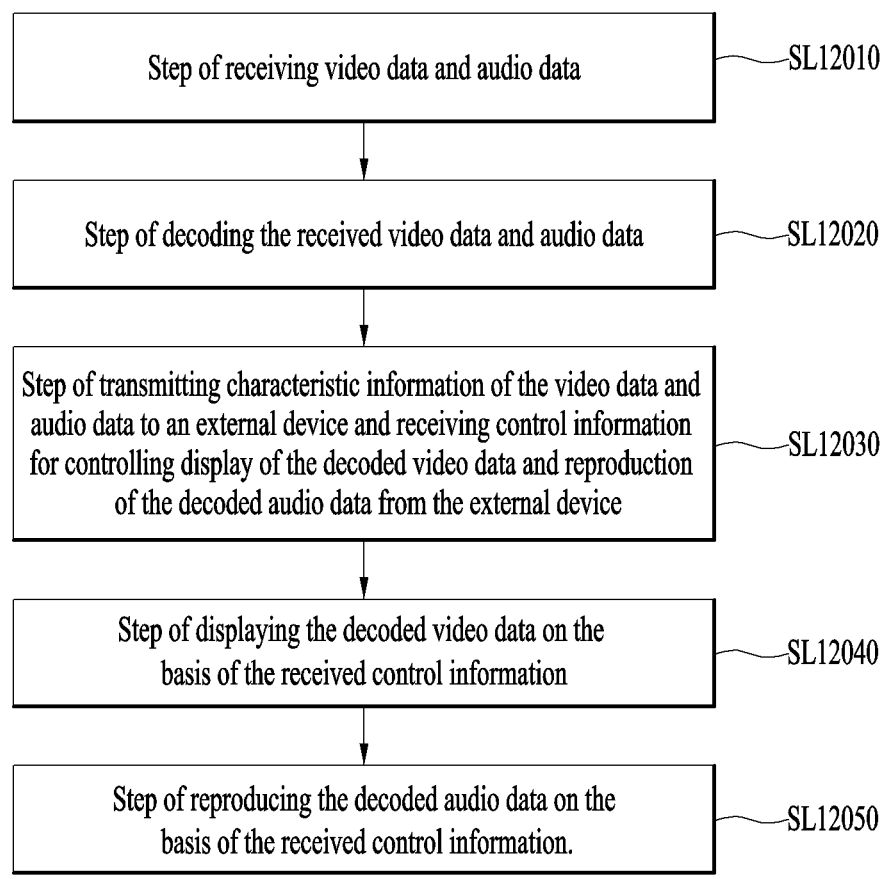
FIG. 12 illustrates a broadcast data processing method according to an embodiment of the present invention.

FIG. 12 illustrates a broadcast data processing method according to an embodiment of the present invention.

The broadcast data processing method according to an embodiment of the present invention may include a step SL12010 of receiving video data and audio data, a step SL12020 of decoding the received video data and audio data, a step SL12030 of transmitting characteristic information of the video data and audio data to an external device and receiving, from the external device, control information for controlling display of the decoded video data and reproduction of the decoded audio data, a step SL12040 of displaying the decoded video data on the basis of the received control information and/or a step SL12050 of reproducing the decoded audio data on the basis of the received control information. Here, the external device may refer to a secondary device.

The steps of the broadcast data processing method according to the embodiment of the present invention can be performed by the corresponding components of the aforementioned broadcast data processing apparatus L1010.

Figure 13:
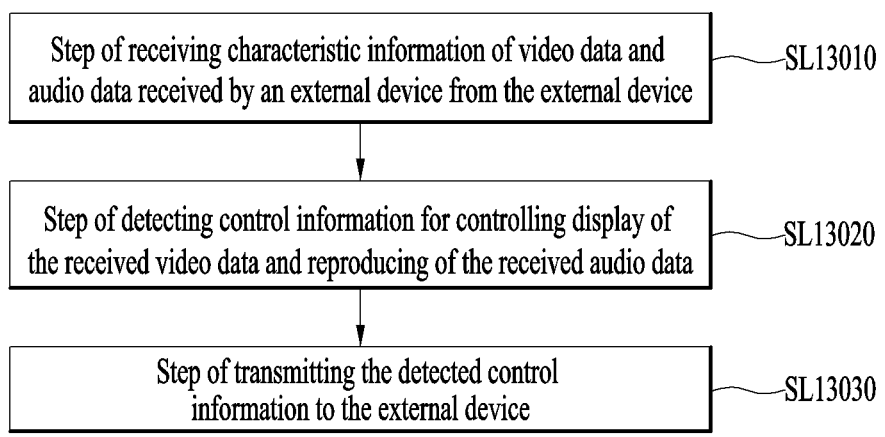
FIG. 13 illustrates a broadcast data processing method according to another embodiment of the present invention.

FIG. 13 illustrates a broadcast data processing method according to another embodiment of the present invention.

The broadcast data processing method according to another embodiment of the present invention may include a step SL13010 of receiving, from an external device, characteristic information of video data and audio data, received by the external device, a step SL13020 of detecting control information for controlling display of the received video data and reproduction of the received audio data and a step SL13030 of transmitting the detected control information to the external device. Here, the external device may refer to a main device.

The steps of the broadcast data processing method according to the embodiment of the present invention can be performed by the corresponding components of the aforementioned broadcast data processing apparatus L1010.

Figure 14:
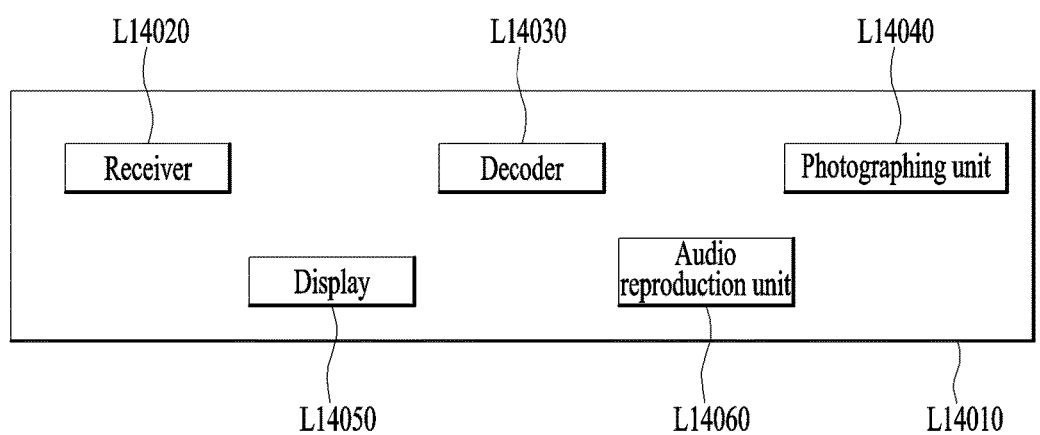
FIG. 14 illustrates a configuration of a broadcast data processing apparatus according to another embodiment of the present invention.

FIG. 14 illustrates a configuration of a broadcast data processing apparatus according to another embodiment of the present invention.

The broadcast data processing apparatus L14010 according to another embodiment of the present invention may include a receiver L14020, a decoder L14030, a photographing unit L14040, a display L14050 and/or an audio reproduction unit L14060. These components have been described above with reference to FIG. 10.

The receiver may receive video data, audio data, and signaling information indicating 3D coordinate values of recommended view positions.

The decoder may decode the received video data and audio data.

The photographing unit may photograph a space in which the broadcast data processing apparatus is installed. Here, the photographing unit may refer to a camera.

The display may display the photographed image and the decoded video data. Here, the display may display recommended view position on the photographed image on the basis of the signaling information.

The audio reproduction unit may reproduce the decoded audio data.

Modules, units or blocks according to embodiments of the present invention may be processors/hardware executing consecutive procedures stored in a memory (or storage unit). The steps or methods described in the above embodiments may be performed by hardware/processors. In addition, the methods proposed by the present invention may be executed as code. This code can be written in a processor-readable storage medium and thus read by a processor provided by the apparatus according to embodiments of the present invention.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The image processing methods according to the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

MODE FOR INVENTION

Various embodiments have been described in the best mode for carrying out the invention.

INDUSTRIAL APPLICABILITY

The present invention is applicable to the broadcast industry.

The invention claimed is:

1. An apparatus for processing broadcast data, the apparatus comprising:
a receiver configured to receive, from an external device, characteristic information of video data and audio data received by the external device, the characteristic information including resolution information of the video data and aspect ratio information of the video data;
a sensor unit configured to detect a motion of the apparatus and an inclination of the apparatus using acceleration sensing principle or gyro sensing principle;
a transmitter configured to transmit control information for controlling a rendering process of the video data and a playing process of the audio data to the external device; and
a display configured to display an entire region of the video data using the resolution information and the aspect ratio information,
wherein the display further displays a box identifying a portion of the entire region, the portion being rendered on a display of the external device,
wherein the box is identified based on the motion and the inclination of the apparatus, and
wherein the control information includes information identifying the portion of the entire region.

2. The apparatus according to claim 1, wherein, when the video data received by the external device is 3D video data, the characteristic information further includes depth information of the video data received by the external device,
wherein the display further presents a 3D depth of the video data using the depth information, the 3D depth being adjusted based on the motion and the inclination of the apparatus, and
wherein the control information further includes adjusted depth information according to the adjusted 3D depth of the video data.

3. The apparatus according to claim 1, wherein, when the video data received by the external device is multi-view video data, the characteristic information further includes composition information representing information on multiple views of the multi-view video data,
wherein the display further presents a view among the multiple views of the video data using the composition information, the view being adjusted to another view based on the motion and the inclination of the apparatus, the another view being rendered on the display of the external device, and
wherein the control information further includes information on the another view.

4. The apparatus according to claim 1, wherein, when the audio data received by the external device is object based audio data, the characteristic information includes object volume information about a volume of objects constituting the received audio data,
wherein the display further presents volume corresponding to each of the objects using the object volume information, the volume being adjusted for each object based on the motion and the inclination of the apparatus, the adjusted volume for each object being rendered in the external device, and wherein the control information further includes information on the adjusted volume of the audio data.

5. The apparatus according to claim 1, wherein, when the audio data received by the external device is multichannel audio data, the characteristic information includes channel volume information about channels constituting the received audio data, and wherein the display further presents volume corresponding to each of the channels using the channel volume information, the volume being adjusted for each channel based on the motion and the inclination of the apparatus, the adjusted volume for each channel being rendered in the external device.

6. A method of processing broadcast data in an apparatus for processing the broadcast data, the method comprising:

receiving, from an external device, characteristic information of video data and audio data received by the external device, the characteristic information including resolution information of the video data and aspect ratio information of the video data;

detecting a motion of the apparatus and an inclination of the apparatus using acceleration sensing principle or gyro sensing principle;

transmitting control information for controlling a rendering process of the video data and a playing process of the audio data to the external device; and displaying a box identifying a portion of the entire region, the portion being rendered on a display of the external device, wherein the box is identified based on the motion and the inclination of the apparatus, and wherein the control information includes information identifying the portion of the entire region.

* * * * *